United States Patent Office.

THOMAS FYANS, OF TAUNTON, MASSACHUSETTS, ASSIGNOR TO HIMSELF AND A. T. THOMSON, OF SAME PLACE.

Letters Patent No. 108,129, dated October 11, 1870.

IMPROVEMENT IN COMPOSITIONS FOR WELDING AND RESTORING STEEL.

The Schedule referred to in these Letters Patent and making part of the same.

*To all whom it may concern:*

Be it known that I, THOMAS FYANS, of Taunton, in the county of Bristol and State of Massachusetts, have invented a new and improved Composition for Welding and Restoring Cast-Steel; and I do hereby declare that the following is a full, clear, and exact description thereof, which will enable others skilled in the art to make and use the same.

This invention relates to a new composition, by the use of which cast-steel can be welded, and, should it have been overheated or burnt, restored to its former nature, and made capable of being forged for the finest tools.

The compound consists of the following ingredients, which are compounded in about the proportions set forth, to wit:

Two ounces of borax,
One ounce of bluestone,
Two ounces of salt,
One-half ounce of rosin, and
One quart of common sand.

The first-named four ingredients are powdered before being mixed with the sand.

The composition is used in the same manner as other compounds for the same purpose; that is to say, it is heated before application, and sprinkled over the steel, which is heated and hammered as required.

Having thus described my invention,

I claim as new and desire to secure by Letters Patent—

The composition for welding and restoring cast-steel herein described.

THOMAS FYANS.

Witnesses:
CHARLES H. ALDEN,
STEPHEN SHEPHERD.